G. L. YOUNG.
LOCK NUT.
APPLICATION FILED DEC. 28, 1912.

1,065,759.

Patented June 24, 1913.

Witnesses
EL Cooker
JW Garner

Inventor
George L. Young
By Victor J. Evans
Attorney

UNITED STATES PATENT OFFICE.

GEORGE L. YOUNG, OF FRANKFORT, INDIANA.

LOCK-NUT.

1,065,759.  Specification of Letters Patent.  Patented June 24, 1913.

Application filed December 28, 1912. Serial No. 739,094.

*To all whom it may concern:*

Be it known that I, GEORGE L. YOUNG, a citizen of the United States, residing at Frankfort, in the county of Clinton and State of Indiana, have invented new and useful Improvements in Lock-Nuts, of which the following is a specification.

This invention relates to improvements in nut locks and particularly with reference to the construction of a base washer and a locking spring carried by the nut for engaging the base washer, the invention consisting in the construction, combination and arrangement of devices, hereinafter described and claimed.

Figure 1:
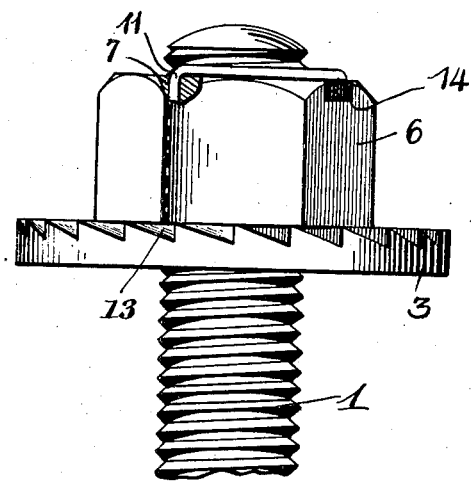
Figure 2:
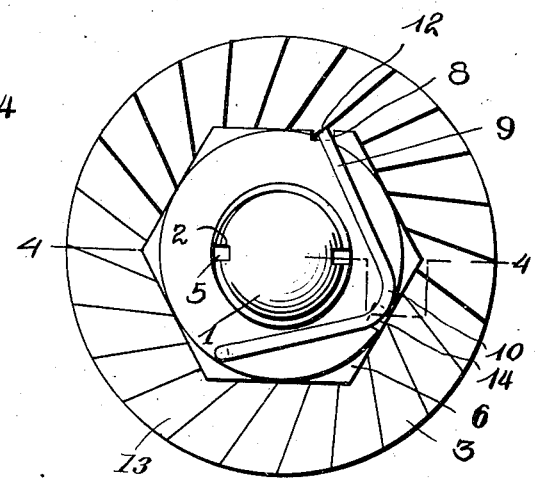
Figure 4:
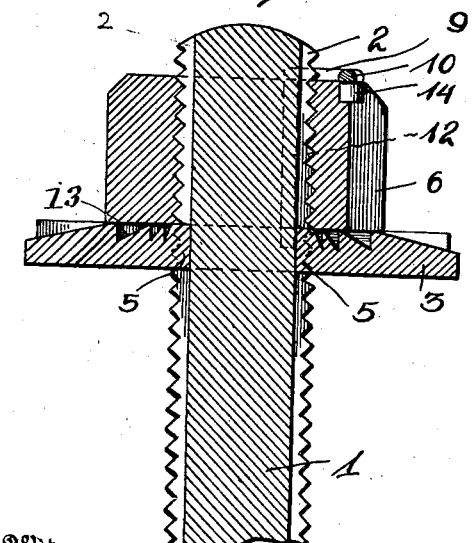
Figure 3:
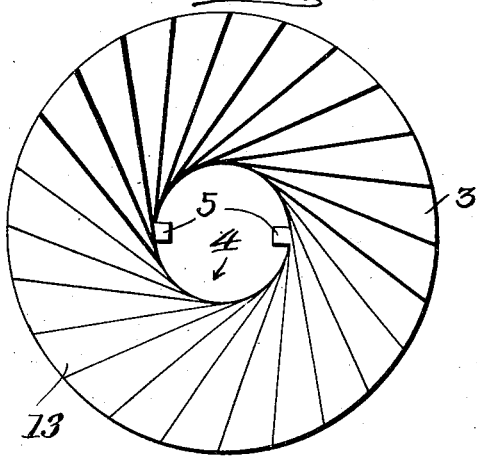

In the accompanying drawing: Figure 1 is a side elevation of a bolt and nut provided with locking devices constructed in accordance with my invention. Fig. 2 is a plan of the same. Fig. 3 is a detail plan of the base washer. Fig. 4 is a detail sectional view on the plane indicated by the line 4—4 of Fig. 2.

The bolt 1, which may be otherwise of any suitable construction is, in accordance with my invention, provided with a suitable number of longitudinal grooves 2 which extend across the threads, two of the said grooves being here shown. In connection with the bolt, I provide a base washer 3 to fit on the bolt, having an opening 4 through which the stem of the bolt extends and provided with studs 5 for engaging the grooves 2 of the bolt to lock the base washer on the bolt against rotation. The nut 6 is provided near one corner with a bore 7 which extends therethrough and is provided near the diagonally opposite corner with a groove 8 in one of its faces, the said groove extending from the inner to the outer side of the nut. A locking spring 9 is employed in connection with the nut and has an angular central portion 10 which bears on the face of the nut, an attaching arm 11 secured in the bore 7 and a locking arm 12 at the end opposite the attaching arm, the said locking arm being arranged in the groove 8 of the nut and adapted at its free end to engage anyone of a series of tangential ratchet teeth 13 with which the base washer is provided. The nut has a recess 14 in one side under the central portion 9 of the locking spring for the insertion of an instrument to release the locking arm of the spring from the ratchet teeth to permit the adjustment of the nut on the bolt or the removal of the nut, as may be desired.

While I have herein shown and described a preferred form of my invention, I would have it understood that changes may be made in the form, proportion and construction of the several parts, without departing from the spirit of my invention and within the scope of the appended claim.

I claim:—

In combination with a bolt having a longitudinal groove extending across its threads, a washer on the bolt having a stud engaging said groove, said washer also having ratchet teeth on its outer face, a nut on the bolt and having a bore near one corner and a groove in one side near the diagonally opposite corner, and a locking spring arranged on the face of the nut having an attaching arm secured in the bore and also having a locking arm arranged in groove of the nut and adapted at its free end to engage the ratchet teeth of the washer.

In testimony whereof I affix my signature in presence of two witnesses.

GEORGE L. YOUNG.

Witnesses:
LEONARD J. CURTIS,
MONT B. FISHER.